United States Patent
Leroux et al.

(10) Patent No.: US 10,193,955 B2
(45) Date of Patent: Jan. 29, 2019

(54) SYSTEM AND METHOD FOR VIDEO COMMUNICATION

(71) Applicant: Huawei Technologies Co., Ltd., Shenzhen (CN)

(72) Inventors: Philippe Leroux, Ottawa (CA); Ngoc Dung Dao, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 162 days.

(21) Appl. No.: 14/514,054

(22) Filed: Oct. 14, 2014

(65) Prior Publication Data

US 2016/0105684 A1   Apr. 14, 2016

(51) Int. Cl.
*H04N 19/593* (2014.01)
*H04L 29/08* (2006.01)
*H04L 29/06* (2006.01)

(52) U.S. Cl.
CPC .......... *H04L 67/06* (2013.01); *H04L 65/4084* (2013.01); *H04L 65/605* (2013.01); *H04L 65/80* (2013.01); *H04L 67/325* (2013.01)

(58) Field of Classification Search
CPC .............................. H04L 67/06; H04N 19/593
USPC .................................................... 375/240.12
See application file for complete search history.

(56) References Cited

U.S. PATENT DOCUMENTS

| | | | | |
|---|---|---|---|---|
| 5,550,590 A * | 8/1996 | Sakazawa | .......... | H04N 21/2365 348/385.1 |
| 2005/0169312 A1* | 8/2005 | Cakareski | .............. | H04L 29/06 370/473 |
| 2006/0015799 A1* | 1/2006 | Sung | ...................... | H04N 19/61 714/795 |
| 2007/0153916 A1* | 7/2007 | Demircin | ........... | H04N 21/2365 375/240.26 |
| 2008/0192822 A1* | 8/2008 | Chang | .................. | H04N 19/172 375/240.03 |
| 2008/0256091 A1* | 10/2008 | Kampmann | ......... | H04N 19/159 |
| 2008/0259799 A1* | 10/2008 | van Beek | ............ | H04L 47/2416 370/235 |
| 2010/0002692 A1* | 1/2010 | Bims | ..................... | H04L 1/0009 370/389 |
| 2010/0246512 A1* | 9/2010 | Kawamura | ........... | H04L 1/0026 370/329 |
| 2011/0150100 A1* | 6/2011 | Abadir | ........... | H04N 21/234345 375/240.26 |

(Continued)

FOREIGN PATENT DOCUMENTS

| | | | | |
|---|---|---|---|---|
| CN | 1764184 A | 4/2006 | | |
| CN | 101686370 A | 3/2010 | | |
| WO | WO 2013126284 A2 * | 8/2013 | ......... | H04N 21/2343 |

OTHER PUBLICATIONS

"Video compression picture types," http://en.wikipedia.org/wiki/Video_compression_picture_types, last modified Mar. 31, 2014, 5 pgs.

*Primary Examiner* — Zhihan Zhou
(74) *Attorney, Agent, or Firm* — Slater Matsil, LLP (57) ABSTRACT

In one embodiment, method for transmitting video includes determining a first video transmission schedule and selecting one frame type of a plurality of frame types to produce a selected encoded frame in accordance with the first video transmission schedule. The method also includes transmitting, by a first device to a second device, the selected encoded.

24 Claims, 5 Drawing Sheets

(56) References Cited

U.S. PATENT DOCUMENTS

| | | | |
|---|---|---|---|
| 2012/0155398 A1* | 6/2012 | Oyman | H04L 47/26 |
| | | | 370/329 |
| 2012/0263241 A1* | 10/2012 | Swenson | H04N 19/172 |
| | | | 375/240.26 |
| 2014/0064071 A1* | 3/2014 | Paladugu | H04W 28/24 |
| | | | 370/230 |
| 2014/0233413 A1* | 8/2014 | Dahod | H04N 21/6131 |
| | | | 370/252 |
| 2015/0036733 A1* | 2/2015 | Smadi | H04N 19/172 |
| | | | 375/240.01 |
| 2015/0264359 A1* | 9/2015 | Vanam | H04N 21/2343 |
| | | | 375/240.27 |

* cited by examiner

SYSTEM AND METHOD FOR VIDEO COMMUNICATION

TECHNICAL FIELD

The present invention relates to a system and method for wireless communications, and, in particular, to a system and method for real time video communication.

BACKGROUND

Real time video may be sensitive to delays. For example, significant latency in real-time video may lead to reduced quality of experience (QoE). Wireless communication represents a source of delay due to fading and scheduling. For example, with wireless sources and/or destinations, latency may build up at either or both ends from fast fading or intra-coded frame (I-frame) collisions. Additionally, latency may build up in the backhaul of a wireless communications system.

Real time video may contain large I-frames and small predicted picture coded frames (P-frames) alternated periodically in a pre-defined matter. In another example, real time video contains bi-predictive picture frames (B-frames). I-frames may be periodic or based on significant changes in the video, for example a scene change. An I-frame encodes a full picture, similar to a static image. I-frames are coded without reference to other frames. They may be generated by an encoder to create a random access point, which facilitates a decoder beginning to decode from that frame. An I-frame represents one instant in the video stream, and it is desirable for it to be pushed quickly. P-frames indicate incremental changes in the video, contain changes from the previous frame, and require the prior decoding of some other picture(s) to be decoded. I-frames or P-frames may be provided at ¹⁄₂₄ of a second. Both image data and motion vector displacements may be included in a P-frame, with combinations of image and motion data. P-frames may also be known as delta-frames. A P-frame contains less information than an I-frame, and therefore is smaller. A B-frame contains less information than P-frame, and is even smaller. The wireless latency which reduces QoE is largely due to an I-frame being sent and received when the schedule is unable to push it quickly. For example, fading might make the situation unfavorable for pushing I-frames. Also, an I-frame collision occurs when two user equipments (UEs) are coupled to the same communications controller, which tries to push an I-frame to both UEs at the same time. It is also problematic for a communications controller to perform both uplink of an I-frame and downlink of an I-frame at the same time.

SUMMARY

An embodiment method for transmitting video includes determining a first video transmission schedule and selecting one frame type of a plurality of frame types to produce a selected encoded frame in accordance with the first video transmission schedule. The method also includes transmitting, by a first device to a second device, the selected encoded frame.

An embodiment method of receiving video includes receiving, by a communications controller from a first user equipment (UE), a first communication requirement of the first UE and determining a video transmission schedule in accordance with the first communication requirement of the first UE. The method also includes transmitting the video transmission schedule and receiving, by the communications controller from the first UE, a video frame in accordance with the video transmission schedule.

An embodiment computer includes a processor and a non-transitory computer readable storage medium storing programming for execution by the processor. The programming including instructions to determine a first video transmission schedule and select one frame type of a plurality of frame types to produce a selected encoded frame in accordance with the first video transmission schedule. The programming also includes instructions to transmit, to a device, the selected encoded frame.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a scheduler of a communications controller and a video encoder are aligned so that, instead of pushing uplink a stream which may be delayed in an uplink buffer on the source device, the data transmitted is current. Reciprocally, a transcoder pushes data for reduced delay to the sink. Coordination may be extended to multiple sources and sinks, for example weather for broadcasting or multicasting.

In an embodiment, there is a link between a scheduler at a communications controller and an encoder in a user equipment (UE). Likewise, there is a link between a transcoder and a scheduler at the downlink side to reduce delays and prevent outdated data from sitting in buffers for an extended period of time. Furthermore, multiple source and sink coordination pairs may smooth the traffic flows and reduce intra-coded frame (I-frame) collisions. A collision may occur when one communications controller pushes two different I-frames to two different UEs at the same time, or two UEs push I-frames to the same communications controller at the same time.

Figure 1:
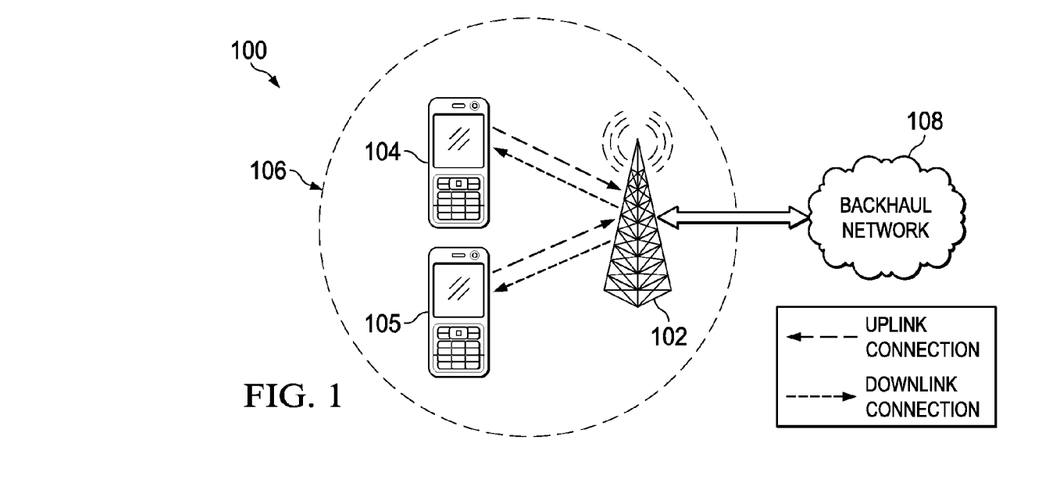
FIG. 1 illustrates a diagram of a wireless network for communicating data.

FIG. 1 illustrates network 100 for communicating data. Network 100 includes communications controller 102 having a coverage area 106, a plurality of user equipments (UEs), including UE 104 and UE 105, and backhaul network 108. Two UEs are depicted, but many more may be present. Communications controller 102 may be any component capable of providing wireless access by, inter alia, establishing uplink (dashed line) and/or downlink (dotted line) connections with UE 104 and UE 105, such as a base station, an enhanced base station (eNB), an access point, a picocell, a femtocell, and other wirelessly enabled devices. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end. In some embodiments, the network 100 may include various other wireless devices, such as relays, femtocells, etc.

Figure 2:
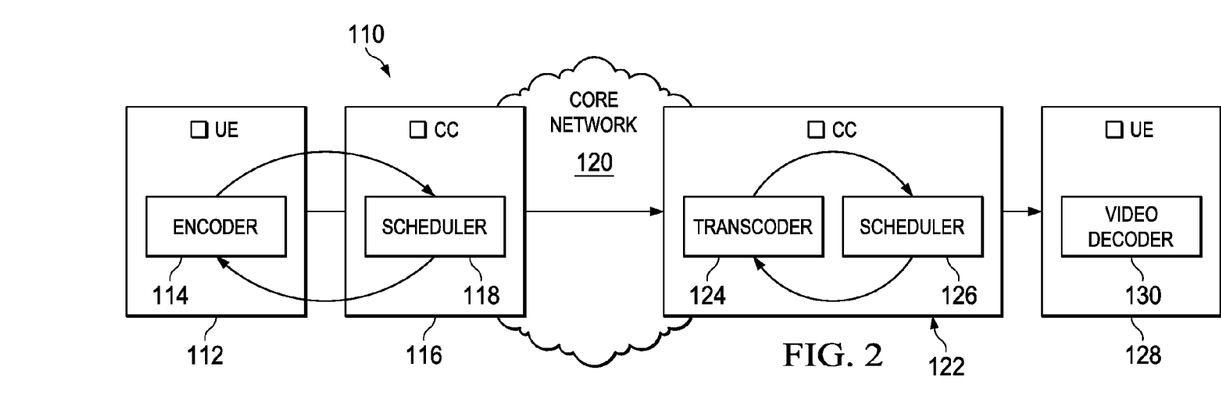
FIG. 2 illustrates an embodiment system for video communication.

FIG. 2 illustrates system 110 for video communications, including uplink and downlink. Uplink is performed from UE 112 with encoder 114 to communications controller (CC) 116 using scheduler 118. Encoder 114 is a scheduling aware encoder block. In one example, encoder 114 is associated with a video-application aware scheduler, such as scheduler 118. Scheduler 118 in communications controller 116 decides which UE(s) should push I-frames and which UEs should push predicted picture coded frames (P-frames). The I-frames of UEs may be coordinated so only one UE, or a limited number of UEs, is pushing an I-frame at a time. Also, channel conditions may be considered in determining the schedule. Communications controller 116 requests that UE 112 push an I-frame or a P-frame. Based on this received message, the UE pushes a P-frame or an I-frame. Scheduler 118 may request periodic schedule optimization updated from UE 112. The video may be passed to communications controller 122 via core network 120.

Downlink is performed from communications controller 122 with transcoder 124 and scheduler 126 to UE 128 with decoder 130. Transcoder 124 is a scheduling-aware transcoder block, which may be combined with scheduler 126, a transcoder aware scheduler. Decoder 130 is capable of decoding non-periodic I-frames and P-frames. Transcoder 124 is an encoder and a decoder which decodes frames received from communications controller 116 and regenerates I-frames and P-frames for transmission. Transcoder 124 attempts to push the data to minimize delays. Transcoder 124 encodes frames as I-frames or P-frames based on information from scheduler 126. In one example, transcoder 124 encodes the frame as both an I-frame and as a P-frame, and selects either the I-frame or the P-frame for transmission based on the schedule. Communications controller 122 transmits the encoded frames to UE 128. Encoder 130 of UE 128 decodes the frames based on a codec which contains information on which frames are I-frames and which frames are P-frames.

In one example, the scheduling-aware video encoder is in a UE for uplink. The encoder communicates its requirements to a scheduler or a scheduler metric. The encoder's requirements may be, for example, one I-frame of $N_i$ bits every i seconds and p P-frames of $N_p$ bits in between the I-frames. Also, the encoder may communicate to the scheduler its delay tolerance margins, bitrate tolerances, and other tolerances. Communication of the encoder's requirements may occur at the start of a session. Alternatively, the communication of requirements may occur over time to adapt to rate demands.

A scheduler or scheduler-metric which supports the video application attempts to match the demand by allocating resource blocks (RBs) based on both buffer size and the statistics of the needs of the encoder. Scheduling may occur in an application layer, for example in the media access control (MAC) layer.

The encoder is informed of the next transmission block and provides the data with low delay. For example, the encoder may continuously generate P-frames and I-frames, and provide the allocated frame for the next transmission. The selected P-frame or I-frame is transmitted in each frame. Then the encoder provides a frame with current video.

In another example, the scheduler is not aware of the encoder. For example, the scheduler is tricked into knowing a buffer status for uplink.

Figure 3:
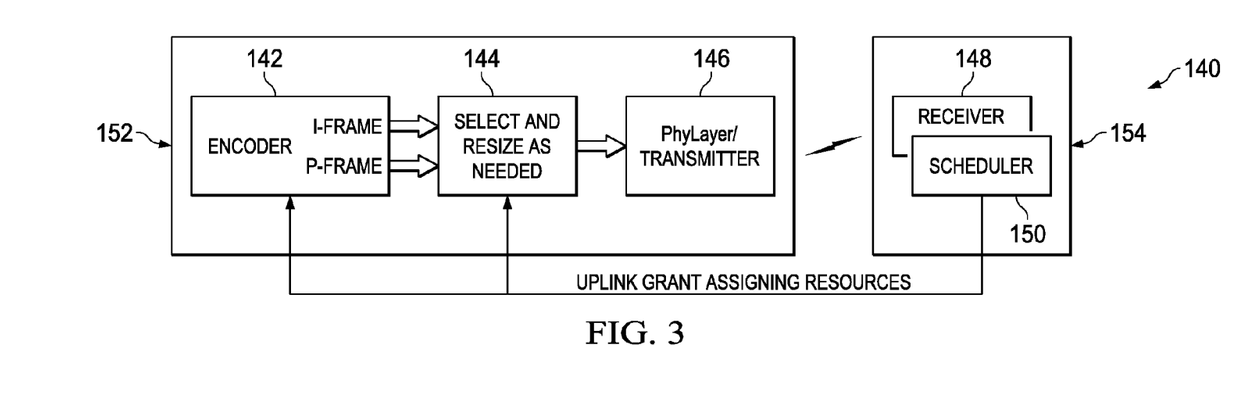
FIG. 3 illustrates an embodiment video encoder.

FIG. 3 illustrates system 140 for encoding video frames. UE 152 contains encoder block 142, selection block 144, and transmitter 146. Encoder block 142 encodes an I-frame and a P-frame. For the frames of video, encoder block 142 encodes both an I-frame and a P-frame. In another example, encoder block 142 generates either an I-frame or a P-frame based on a message from scheduler 150. In one example, encoder block 142 receives a message from scheduler 150 indicating whether encoder block 142 should generate a P-frame and/or an I-frame. Communications controller 154 includes receiver 148 and scheduler 150. The I-frame and P-frame are sent to selection block 144.

Selection block 144 selects the P-frame or the I-frame received from encoder block 142. A message with uplink grant assigning resources is received by selection block 144 from scheduler 150. This message contains information on which frames to send as P-frames and which frames to send as I-frames for the current frame and/or future frames. Also, selection block 254 may resize the selected frame. Then, selection block 144 passes on the selected frame o transmitter 146.

Transmitter 146 transmits the selected frame, a P-frame or an I-frame, to receiver 148. In one example, transmitter 146 is a physical (PHY) layer transmitter.

Selection block 144 informs encoder block 142 that an I-frame has been selected and fully transmitted, so P-frames may be computed from the transmitted I-frame.

In an embodiment, an encoder uses fractal encoding. Fractal encoding facilitates on the fly generation of P-frames and I-frames by truncating an original I-frame. Fractal encoding is a lossy compression method for digital images based on fractals. Fractal algorithms convert parts of an image which resemble other parts of the image to mathematical data called fractal codes, which are used to recreate the encoded image. A fractal encoder admits as many bits from the data stream as necessary.

A communications controller may have a transcoder for downlink. The transcoder makes available real time I-frames or P-frames regardless of whether a received frame is an I-frame or a P-frame, so the appropriate frame is pushed downstream when the schedule schedules a downlink to a UE. The scheduler associated with the transcoder, in the communications controller, knows the basic statistics of the data stream, and provides appropriate flow rates and adequate timing to the transcoder. The transcoder communicates its needs to the scheduler, which creates a schedule based on the encoder's needs. For example, the transcoder may need one I-frame of $N_i$ bits every n seconds and p P-frames of $N_p$ bits between I-frames. Tolerances of the transcoder may be considered, for example, delay tolerance margins and bitrates tolerances. In one example, the frames sent to multiple UEs are considered. The scheduler meets the demands by allocating RBs based on both possible buffer sizes and the statistics of the needs. Scheduling may occur in the MAC layer.

Figure 4:
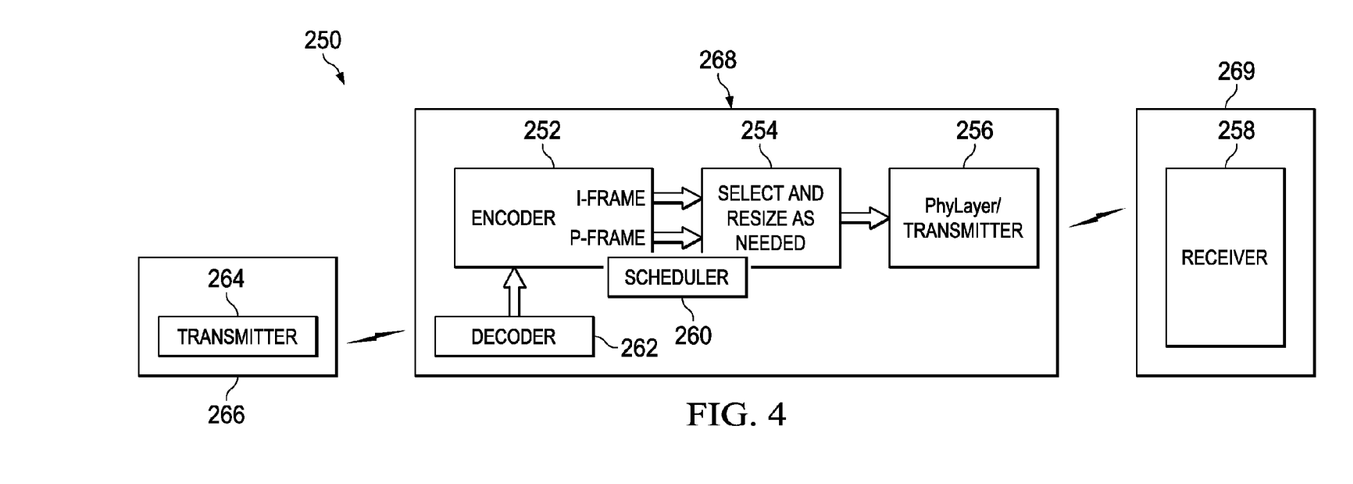
FIG. 4 illustrates an embodiment video transcoder.

FIG. 4 illustrates system 250 for transcoding video frames. Communications controller 268 contains decoder 262, encoder 252, scheduler 260, selection block 254, and transmitter 256. Decoder 262 on communications controller 268 receives and decodes frames from transmitter 264 on UE 266. The received frames may be a sequence of I-frames and P-frames. In one example, the I-frames and P-frames are in a pre-defined pattern. Alternatively, the I-frames and P-frames are at irregular intervals, for example when they are adaptively determined. Decoder 262 passes the decoded frames to encoder 252.

Encoder 252 encodes the frames received from decoder 262. Encoder 252 may encode the frames as both an I-frame and a P-frame. Alternatively, encoder 252 encodes either an I-frame or a P-frame based on a schedule from scheduler 260. The encoded I-frame and P-frame are passed to selection block 254.

Alternatively, the scheduler directly pushes the incoming frames. In this example, an encoder and decoder is not used.

Scheduler 260 schedules the sequence of I-frames and P-frames based on the resources available. The channel conditions and use by other UEs may be considered in scheduling the I-frames. For example, collisions of I-frames may be avoided by delaying an I-frame. Then, scheduler 260 informs selection block 254 whether to select a P-frame or an I-frame.

Selection block 254 selects either the I-frame or the P-frame from encoder 252. Also, selection block 254 may resize the selected frame. The selected frame is passed to transmitter 256.

Transmitter 256, for example a PHY layer transmitter, transmits the selected frame to receiver 258 in UE 269. UE 269 then decodes the received frame.

In one embodiment, the transcoder uses fractal encoding. Fractal encoding facilitates on the fly generation of P-frames and I-frames by truncating an original I-frame. Fractal encoding is a lossy compression method for digital images based on fractals. Fractal algorithms convert parts of an image which resemble other parts of the image to mathematical data called fractal codes, which are used to recreate the encoded image. A fractal encoder admits as many bits from the data stream as necessary.

Figure 5:
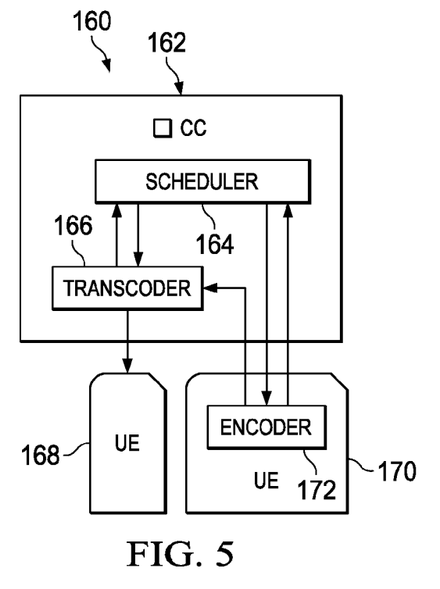
FIG. 5 illustrates another embodiment system for video communication.

FIG. 5 illustrates system 160 for multi-user real time video. UE 170 with encoder 172 uplinks real time video to communications controller 162. Encoder 172 sends its requirements to scheduler 164 in communications controller 162. In response, scheduler 164 creates and transmits a schedule to encoder 172. Encoder 172 then uplinks real time video to transcoder 166 based on the schedule.

Transcoder 166 receives the real time video from encoder 172 and decodes the video frames. Then, transcoder 166 re-encodes the video. Transcoder 166 informs scheduler 164 of its needs. Scheduler 164 considers the requirements of uplink from encoder 172 and for downlink by transcoder 166 when forming a scheduler. For example, scheduler 164 may avoid uploading and downloading an I-frame at the same time. In this manner, collisions may be avoided. Scheduler 164 responds by informing transcoder 166 of the schedule. Transcoder 166 then downlinks real time video to UE 168.

In one example, UE 168 and UE 170 are video chatting. UE 170 pushes a frame to UE 168. When UE 170 pushes an I-frame, scheduler 164 schedules a smaller P-frame for UE 168. Alternatively, UE 168 and UE 170 are both uploading frames or both downloading frames. When both UEs are uploading, and one UE is pushing an I-frame, the communications controller tells the other UE to push a P-frame. If the other UE wants to push an I-frame, it does so after the first UE finishes uploading the I-frame.

Figure 6:
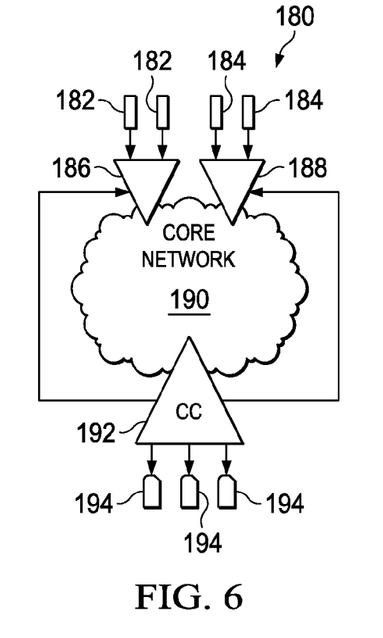
FIG. 6 illustrates an embodiment system for video communication with communications throughout a network.

FIG. 6 illustrates system 180 for cross node communication of video aware schedulers. Communications controller 192 performs uplink and downlink with UEs 194, and communicates with communications controllers 186 and 188 over core network 190. Communications controller 186 communicates with UEs 182, while communications controller 188 communicates with UEs 184. Schedulers in the downlink side may communicate directly with one or more schedulers on the downlink side for coordination to prevent collisions. For example, when communications controller 192 is receiving an I-frame, it may request that communications controllers 186 and 188 shift their I-frames so they are communicating I-frames at different times. The communications controllers may shift their I-frames, for example, by about 5 milliseconds to about 10 milliseconds. Communications controllers 186 may or may not adjust the timing of their I-frames based on the request from communications controller 192. For example, this decision may consider the channel quality and the user needs.

Figure 7:
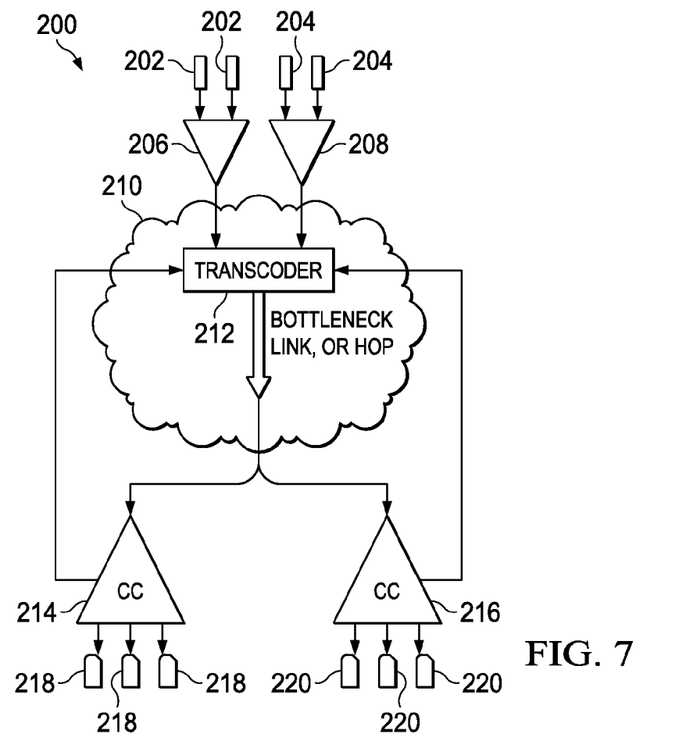
FIG. 7 illustrates an embodiment system for video communication with a standalone transcoder.

FIG. 7 illustrates system 200 with multi-hop or bottleneck links. UEs 202, 204, 218, and 220 communicate real time video with communications controllers 206, 208, 214, and 216, respectively. For example, communications controllers 206 and 208 downlink real time video, while communications controllers 214 and 216 uplink real time video.

Transcoder 212 in backhaul network 210 coordinates the traffic of communications controllers 206, 208, 214, and 216. In one example, transcoder 212 is a standalone device in the backhaul. There is a bottleneck link or hop between transcoder 212 and communications controllers 214 and 216.

The transcoder may perform scheduling among communications controllers based on fading. The transcoder may also match I-frame alignment within the individual communications controllers to avoid collisions. In one example, the same transcoder is used throughout the network to manage multiple flows for either multiple wireless hop links or capacity limited links which use I-frame alignment to prevent collisions. The end link may message the transcoder instead of the source.

Also, a central entity, for example a network controller, may coordinate the positioning of a transcoder in the network. The network controller may have messaging flows routed to it. The messaging flows may activate and deactivate the network controller to act as a transcoder. Such coordination may be done jointly with traffic engineering algorithms.

Figure 8:
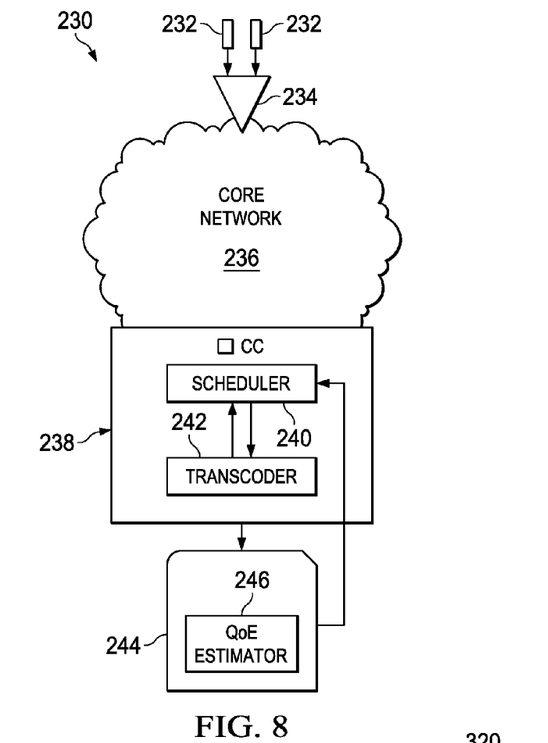
FIG. 8 illustrates an embodiment system for video communication with quality of experience (QoE) monitoring.

FIG. 8 illustrates system 230 for transmitting real time video with a quality of experience (QoE) aware scheduler. Communications controller 234 communicates real time video with UEs 232. Also, communications controller 234 coordinates with communications controller 238 via core network 236.

Communications controller 238 communicates real time video with UE 244. UE 244 contains QoE estimator 246, which determines the QoE. In one example, QoE estimator 246 is in the applications layer of a decoder. QoE estimator 246 monitors the video output to determine the QoE. The QoE is transmitted to scheduler 240 in communications controller 238.

In performing scheduling, scheduler 240 considers the QoE, as well as requirement information from transcoder 242. For example, the scheduler may lower the resources for high QoE users by increasing the number of I-frames and raise the quality for low QoE users by reducing the number of I-frames. Also, the QoE information may facilitate planning of resource allocation to reduce efforts the transcoder or encoder in generating frames. For example, the transcoder or encoder may generate either an I-frame or a P-frame for a frame based on the advance schedule. Transcoder 242 downlinks real time video frames to UE 244 based on the schedule from scheduler 240.

Figure 9:
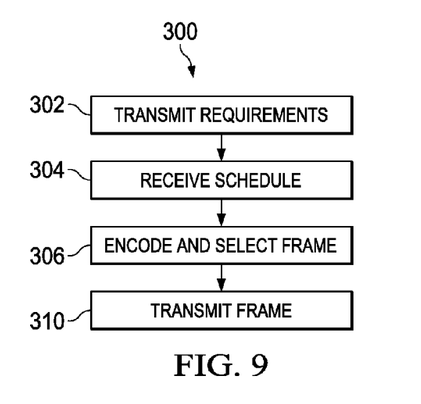
FIG. 9 illustrates an embodiment method of transmitting video performed by an encoder.

FIG. 9 illustrates flowchart 300 for a method of transmitting real time video by a UE. Initially, in step 302, the UE transmits its requirements to a device, such as a communications controller or a standalone scheduler. For example, the requirements may before one I-frame of $N_i$ bits every n seconds and p P-frames of $N_p$ bits between I-frames. Alternatively, the requirements may be one I-frame of $N_i$ bits every n seconds and b bi-predictive picture frames (B-frames) of $N_b$ bits and p P-frames of $N_p$ bits between I-frames. In other examples, other frame types are used. Tolerances, such as delay tolerance margins and bitrate tolerances, may also be transmitted to the scheduler. In one example, QoE information is also transmitted to the scheduler from the UE.

In step 304, the UE receives a scheduler from the scheduler. In one example, the schedule indicates which frame type to transmit for the current transmission. Instead of or in addition to the current transmission, the schedule may indicate whether to transmit future frames as I-frames, B-frames, or P-frames. In one example, the scheduling occurs once at the start of a session. Alternatively, the scheduling occurs continuously to adapt to changes over time.

Next, in step 306, the frame is selected and encoded. In one example, a frame is encoded as both a P-frame and an I-frame, or as a P-frame, an I-frame, and a B-frame. Then, one of the frames is selected based on the schedule. In another example, one frame type is encoded based on the scheduler. Alternatively, the frame is fractal encoded. The frame may also be resized.

Finally, in step 310, the selected encoded frame, an I-frame, a B-frame, or a P-frame, is transmitted to the communications controller from the UE. This may be performed in a PHY layer.

Figure 10:
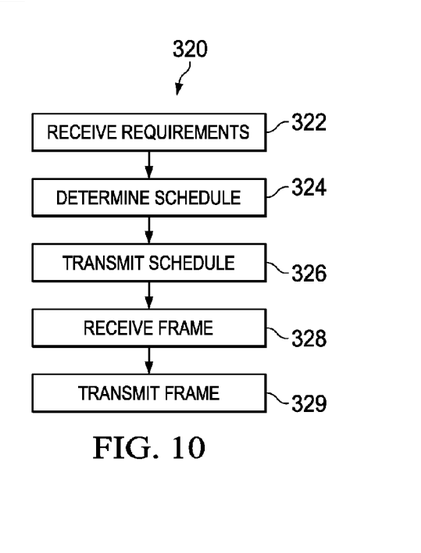
FIG. 10 illustrates an embodiment method of receiving video performed by a communications controller.

FIG. 10 illustrates flowchart 320 for a method of receiving real time video, for example by a communications controller. Initially, in step 322, the communications receives requirements from a UE. The requirements may include the size of the I-frames and the P-frames and the spacing between I-frames, or the size of I-frames, P-frames, and B-frames, and spacing between the three frame types, along with tolerances, such as tolerance margins and bitrate tolerances. In one example, the QoE is also received.

Next, in step 324, the communications controller determines the schedule. The schedule is based on the requirements received by the communications controller in step 322, and on requirements of other UEs. For example, the communications controller may prevent multiple UEs at a time from transmitting or receiving an I-frame to avoid collisions. The channel conditions and/or QoE may also be considered. For example, a UE with a low QoE may receive more I-frames, and the expense of UEs with a high QoEs, to maintain a relatively good QoE for all users. The communications controller may also receive scheduling information from other communications controllers. Additionally, the schedules of other communications controllers may be considered in setting a schedule.

Then, in step 326, the communications controller transmits the schedule to the UE. New schedules may be continuously transmitted. Alternatively, a new schedule is transmitted ones at the start of a session. In one example, the schedule is also transmitted to other communications controllers to coordinate scheduling throughout the network.

In step 328, the communications controller receives a frame from the UE. The frame may be an I-frame, a P-frame, or a B-frame. In one example, the frame is decoded. The frame may then be re-encoded. Alternatively, the received frame remains encoded.

Finally, in step 329, the communications controller re-transmits the frame. The frame may be retransmitted to another UE, or to another communications controller via a network.

Figure 11:
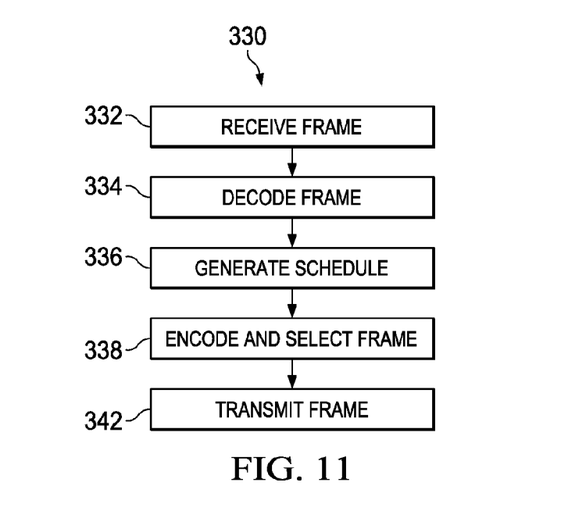
FIG. 11 illustrates an embodiment method of receiving and transmitting video performed by a transcoder.

FIG. 11 illustrates flowchart 330 for a method of receiving and transmitting real time video. The method may be performed by a communications controller. Alternatively, the method is performed by a standalone transcoder. Initially, in step 332, the transcoder receives a frame. In one example, the frame is received by a communications controller from a UE. In another example, the frame is received by a standalone transcoder from a communications controller. The received frame may be a P-frame, an I-frame, or a B-frame.

Next, in step 334, the frame received in step 334 is decoded. The frame may be decoded whether it is an I-frame, a P-frame, and/or a B-frame.

In step 336, a schedule is determined. The schedule may be determined based on the needs of the various UEs and the channel characteristics. If there is a temporary channel problem, I-frames may be delayed until the problem is solved. I-frames for different UEs may be scheduled for different times to avoid collisions. The QoE may also be considered by giving a UE with a low QoE more I-frames. Traffic in other communications controllers throughout the network may also be considered. For example, the schedule is shared with other transcoders, or schedules from other transcoders may be received.

Then, in step 338, the frame decoded in step 334 is selected and encoded based on the schedule from step 336. In one example, the potential frame types for the decoded frame is created, and one of the frame types is selected based on the schedule. In another example, only one frame is generated based on the schedule. In an additional example, the frame is fractal encoded. The frame may be resized.

Finally, in step 342, the selected encoded frame is transmitted. In one example, the frame is transmitted by a communications controller to a UE. Alternatively, the frame is transmitted from a standalone transcoder to a communications controller, where it will be forwarded to a UE.

Figure 12:
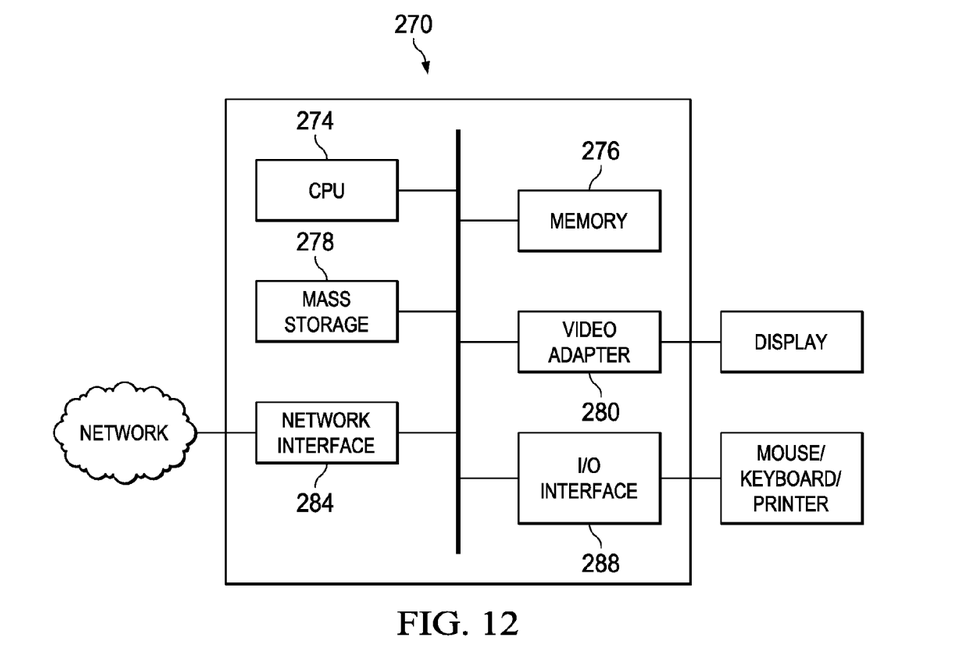
FIG. 12 illustrates a block diagram of an embodiment general-purpose computer system.

FIG. 12 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for transmitting video, the method comprising:
   receiving, by a first device, a first video transmission schedule indicating a first frame type of different frame types to be transmitted;
   encoding, by the first device, a first video frame of video frames to generate a first encoded video frame based on the first frame type of the first video transmission schedule;
   transmitting, by the first device towards a second device, the first encoded video frame;
   after the transmitting the first encoded video frame, receiving, by the first device, a second video transmission schedule determined in accordance with characteristics of a channel and use of the channel by other devices, the second video transmission schedule indicating a second frame type of the different frame types to be transmitted, wherein the use of the channel by other devices comprises information for selecting a predicted picture coded frame (P-frame) to avoid collisions of intra-coded frames (I-frames);
   encoding, by the first device, a second video frame of the video frames to generate a second encoded video frame based on the second frame type of the second video transmission schedule; and
   transmitting, by the first device towards the second device, the second encoded video frame.

2. The method of claim 1, wherein the different frame types comprise an I-frame and a P-frame.

3. The method of claim 2, wherein the different frame types further comprise a hi-predictive picture frame (B-frame).

4. The method of claim 1, further comprising:
   receiving, by the first device, a received frame; and
   decoding the received frame to produce one of the video frames.

5. The method of claim 1, wherein the encoding the first video frame further comprises:
   encoding the first video frame in the video frames to generate an I-frame;

encoding the first video frame to generate a P-frame; and
selecting one of the I-frame and the P-frame as the first encoded video frame.

6. The method of claim 1, wherein the encoding the first video frame further comprises encoding the first video frame to generate only a single first encoded video frame having the first frame type.

7. The method of claim 6, wherein the first video frame is encoded using fractal encoding.

8. The method of claim 1, wherein the first device is a communications controller and the second device is a user equipment (UE).

9. The method of claim 8, wherein the first video transmission schedule indicates only one I-frame for transmission at a time.

10. The method of claim 1, wherein the first device is a UE and the second device is a communications controller.

11. The method of claim 1, wherein the first device is a network controller and wherein the second device is a communications controller.

12. The method of claim 1, wherein the channel comprises a wireless communications channel.

13. The method of claim 1, further comprising:
receiving, by the first device, a third video transmission schedule indicating a third frame type of the different frame types scheduled to be transmitted; and
encoding, by the first device, a third video frame of the video frames to generate a third encoded video frame based on the third frame type of the third video transmission schedule, and transmitting, by the first device towards the second device, the third encoded video frame, wherein the first, second, and third video frames are consecutive video frames of the video frames.

14. The method of claim 1, further comprising resizing the first encoded video frame before transmitting the first encoded video frame.

15. The method of claim 1, further comprising receiving, by the first device from the second device, the first video transmission schedule.

16. The method of claim 1, further comprising:
determining a Quality of Experience (QoE); and
transmitting, by the first device towards the second device, the QoE.

17. The method of claim 1, wherein the first encoded video frame is transmitted in accordance with timing information in the first video transmission schedule.

18. A method of receiving video, the method comprising:
receiving, by a communications controller from a first user equipment (UE), a first communication requirement of the first UE;
determining, by the communications controller, a first video transmission schedule in accordance with the first communication requirement of the first UE, the first video transmission schedule comprising information that specifies a first frame type scheduled for the first UE to transmit to the communications controller, wherein the first video transmission schedule is used by the first UE to encode a first video frame of video frames to generate a first encoded video frame based on the first frame type of the first video transmission schedule;
transmitting the first video transmission schedule towards the first UE;
receiving, by the communications controller from the first UE, the first encoded video frame;
after receiving the first encoded video frame, determining, by the communications controller, a second video transmission schedule in accordance with characteristics of a channel, and use of the channel by other devices, the second video transmission schedule comprising information that specifies a second frame type scheduled for the first UE to transmit to the communications controller, wherein the second video transmission schedule is used by the first UE to encode a second video frame of the video frames to generate a second encoded video frame based on the second frame type of the second video transmission schedule, and wherein the use of the channel by other devices comprises information for selecting a predicted picture coded frame (P-frame) to avoid collisions of intra-coded frames (I-frames);
transmitting the second video transmission schedule towards the first UE; and
receiving, by the communications controller from the first UE, the second encoded video frame.

19. The method of claim 18, further comprising receiving, by the communications controller from a second UE, a second communication requirement of the second UE, wherein determining the first video transmission schedule further comprises determining the first video transmission schedule in accordance with the second communication requirement of the second UE.

20. The method of claim 19, wherein the first communication requirement comprises an I-frame spacing, an I-frame size, and a P-frame size.

21. The method of claim 20, wherein the first communication requirement further comprises a quality of experience (QoE) for the first UE.

22. An apparatus, comprising:
a processor; and
a non-transitory computer readable storage medium storing programming for execution by the processor, the programming including instructions to:
receive a first video transmission schedule indicating a first frame type of different frame types to be transmitted;
encode a first video frame of video frames to generate a first encoded video frame based on the first frame type of the first video transmission schedule;
transmit the first encoded video frame;
after transmitting the first encoded video frame, receive a second video transmission schedule determined in accordance with characteristics of a channel and use of the channel by other devices, the second video transmission schedule indicating a second frame type of the different frame types to be transmitted, wherein the use of the channel by other devices comprises information for selecting a predicted picture coded frame (P-frame) to avoid collisions of intra-coded frames (I-frames);
encode a second video frame of the video frames to generate a second encoded video frame based on the second frame type of the second video transmission schedule; and
transmit the second encoded video frame.

23. The apparatus of claim 22, the programming further including instructions to:
receive a received frame; and
decode the received frame to produce one of the video frames.

24. The apparatus of claim 22, the programming further including instructions to:
encode the first video frame in the video frames to generate an it-frame;

encode the first video frame to generate a P-frame; and
select one of the I-frame and the P-frame as the first encoded video frame.

\* \* \* \* \*

UNITED STATES PATENT AND TRADEMARK OFFICE
CERTIFICATE OF CORRECTION

PATENT NO. : 10,193,955 B2
APPLICATION NO. : 14/514054
DATED : January 29, 2019
INVENTOR(S) : Philippe Leroux et al.

Page 1 of 1

It is certified that error appears in the above-identified patent and that said Letters Patent is hereby corrected as shown below:

In the Claims

In Column 10, Line 58, Claim 3, delete "hi-predictive" and insert --bi-predictive--.

In Column 12, Line 67, Claim 24, delete "it-frame" and insert --I-frame--.

Signed and Sealed this
Nineteenth Day of March, 2019

Andrei Iancu
*Director of the United States Patent and Trademark Office*